Figure 1:
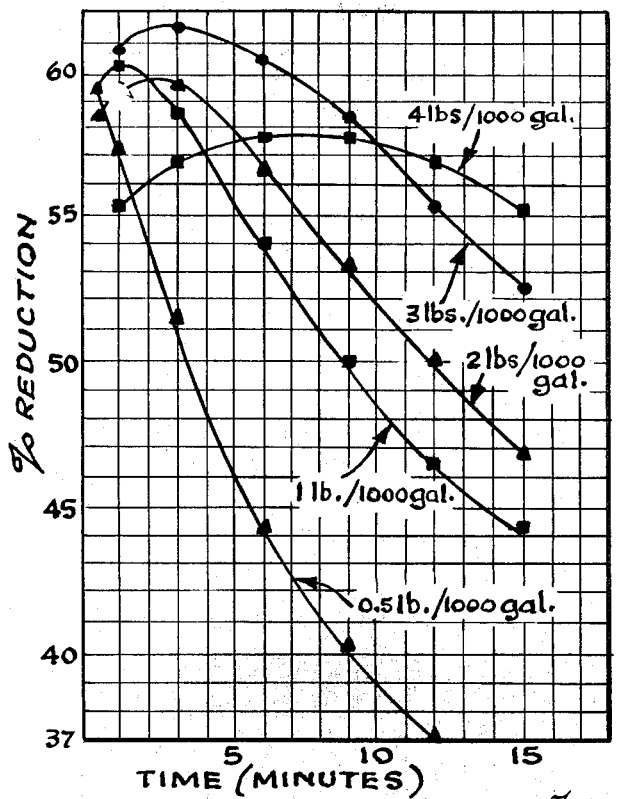

United States Patent [19]

Schuh

[11] 3,857,402

[45] Dec. 31, 1974

[54] TRANSMISSION OF OIL

[75] Inventor: Theodore R. Schuh, North Riverside, Ill.

[73] Assignee: Nalco Chemical Company, Chicago, Ill.

[22] Filed: Aug. 31, 1972

[21] Appl. No.: 285,511

[52] U.S. Cl.............. 137/13, 166/308, 252/8.55 R
[51] Int. Cl........................... F17d 1/16, F17d 1/18
[58] Field of Search.............. 252/8.55 R; 166/308; 137/13; 44/7

[56] References Cited
UNITED STATES PATENTS

| | | | |
|---|---|---|---|
| 2,492,173 | 12/1949 | Mysels | 137/13 |
| 3,215,154 | 11/1965 | White et al. | 137/13 |
| 3,493,000 | 2/1970 | Canevari et al. | 137/13 |
| 3,542,044 | 9/1966 | Hansen | 252/8.55 R |
| 3,639,108 | 2/1972 | Finkelstein et al. | 44/7 |
| 3,654,994 | 4/1972 | Slagel et al. | 166/308 |

*Primary Examiner*—William E. Schulz
*Attorney, Agent, or Firm*—Kinzer, Plyer, Dorn & McEachran

[57] ABSTRACT

The transmission of (crude) oil is improved by adding thereto a latex containing a friction reducing polymer and a surfactant which inverts the latex so that the friction reducing particles are dispersed if not dissolved, in the oil medium.

1 Claim, 3 Drawing Figures

% FRICTION REDUCTION VS TIME
EFFECT OF CONCENTRATION
Polyisobutylene (M.W.=350,000)

% FRICTION REDUCTION VS. TIME
EFFECT OF MOLECULAR WEIGHT (Staudinger)
All Runs Using Polyisobutylene
at 3 lbs./1000 gal.

TRANSMISSION OF OIL

This invention relates to the transmission of oil such as crude oil in a pipeline.

State of the Art:

Normal flow of oil under pressure in a pipe is turbulent, accounting for a larger pressure drop than if the flow was ideally laminar. The ideal condition can be approached by introducing a so-called friction reducer, manifest in less pressure drop compared to the instance where the oil is transmitted without a friction reducer. This is accomplished in the present state of the art by dissolving a polymer in an oil base, and adding the solution to the oil medium being transmitted.

The Problem:

The present technique is to dissolve the friction reducing polymer in a hydrocarbon solvent, but no more than about 3% solids because at higher concentrations the solution is too viscous for the intended use. In many instances, a 1% solution is the top concentration which can be handled efficiently. The difficulty and the problem is that an expensive solvent must be employed while only attaining 1–3% active ingredient; and even so, it takes a long time to dissolve the polymer while using special equipment to encourage solution. Because of high viscosity, the solution is not easily mixed with the main oil stream and only slowly at that. Undissolved lumps of polymer can plug the line. Frankly, the known procedure is difficult to administer and the low solids content, characterizing a viscosity which can be handled, does not justify the cost of preparing and shipping a 1–3% solution of the polymer for field use.

The Object of the Invention; The Answer to the Problem

It is of course advantageous to effectively reduce the friction of oil such as crude oil flowing in a pipe line. In the instance of over-land pipelines, fewer pumping stations are required because pumping efficiency is increased, due of course to reduced pipeline friction.

Ship owners are charged per diem docking fees; consequently, the quicker crude oil can be pumped from a tanker to on-shore storage facilities, the better. Thus, a friction reducer in this phase of oil transmission speeds the transfer and reduces dock costs.

Oil wells may be fractured by introducing crude oil under tremendous pressure and as fast as possible into the subterranean deposit. An effective friction reducer accelerates the fracturing process.

In view of the foregoing, the objects of the present invention are to reduce the friction prevailing during transfer of oil in a pipe by a procedure easily applied in the field.

The foregoing object, and the answer to the problems presented by the procedure heretofore applied, is attained by introducing the friction reducer into the oil medium as a latex (polymer dispersed in water) and employing a surfactant to invert the latex whereby the polymer is dispersed in the oil medium. The polymer is oil soluble, preferably polyisobutylene. The surfactant is oil soluble and non-ionic; it in effect neutralizes the electrical charges which hold the polymer particles dispersed in the water phase which characterizes the latex, and releases the polymer particles which then dissolve or disperse uniformly in the oil medium where they perform the useful work of reducing friction. Obviously some water is introduced into the oil medium, but the amount is not unacceptable especially in oil well fracturing where water itself is sometimes the fracturing medium pumped into the subterranean deposit.

Figure 3:
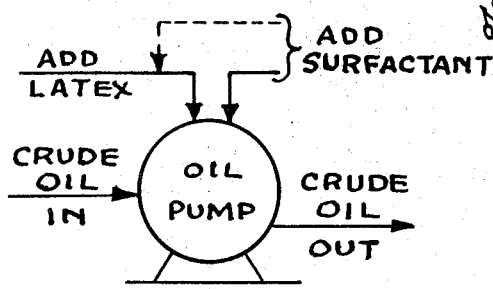
Figure 2:
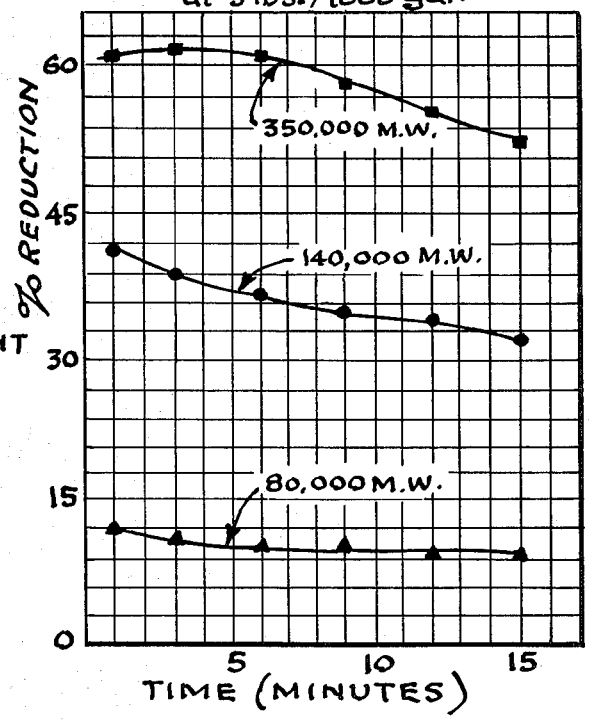

In the drawing, FIG. 1 is a chart showing that percent friction reduction is generally proportional to concentration of the friction reducing agent;

FIG. 2 is a chart showing that percent reduction in friction is generally proportional to molecular weight of the friction reducing agent; and FIG. 3 is a schematic drawing of how the invention may be practiced in the field.

Previous work established the data set forth in FIGS. 1 and 2, polyisobutylene having been selected as displaying somewhat superior friction reduction compared to natural rubber, although the two are virtually otherwise interchangeable. Kerosense was used as the oil medium being pumped, fully representative of crude oil. Reduction in friction can be taken as an inverse measure of pressure drop which is easily determined by observing the pressure drop between two given spaced locations in the transmission system, with and without the presence of the friction reducing agent. The effect of concentration (FIG. 2) and molecular weight (FIG. 3) are evident; and by recirculating the kerosene containing the friction reducer, one can determine effectiveness of the friction reducer after a time lapse, its resistance to degradation in otherwords (FIG. 2).

With the foregoing in mind, the difficulty of preparing and using polymer solutions in the field, mentioned above, is conceived of as overcome simply by employing an easily transported latex containing the polymer in a high concentration and concurrently therewith a surfactant (each commercially available) effective to invert the emulsion from one in water containing the polymer to one in oil containing it. FIG. 3 shows one way in which the invention may be practiced in the field. Crude oil is being transmitted by an oil pump. To reduce friction, the pumping station attendant from time to time introduces into the pump predetermined amounts of latex and surfactant; they may be added separately or together. Examples shall now be given, easily translated into field use:

EXAMPLE 1

To 100 grams of kerosene add one gram of sorbitan trioleate, which dissolves in the kerosene, and two mls. of a natural rubber latex (cis 1-4 polyisoprene; 65% solids in water) or a polyisobutylene latex (65% solids in water) with rapid stirring. The latex (water base) is inverted (becomes oil miscible) and is thoroughly dispersed if not completely dissolved in the kerosene in less than 1 minute. The addition of a small amount of isopropanol (1 or 2 grams) assures a perfectly clear transparent solution. steady, firm agitation is all that is necessary to achieve good dispersion (or solution) of the polymer in oil. Special equipment is not necessary and hence the invention is practiced in the field, FIG. 3, merely be adding the latex and surfactant concurrently to the oil flowing through the pump.

EXAMPLE 2

Either latex of Example 1 is used, 4 grams, added to 200 grams of kerosene containing 3 grams of alkylphenoxypoly (ethyleneoxy) ethanol, a non-ionic surfactant which inverts the latex thereby freeing the polymer from the water and allowing the freed polymer particles to disperse in the kerosene as the friction reducer.

Polyisobutyne is superior to natural rubber from the standpoint of the degree of friction reduction and is therefore preferred. The two surfactants are oil soluble and non-ionic, of HLB value 4 to 6. Undoubtedly other polymers and surfactants can be combined just as successfully and hence the specific combinations disclosed [polyisobutylene latex or natural rubber latex: sorbitan monooleate or alkylphenoxypoly (ethyleneoxy) ethanol] are not to be construed as restricting the invention to name, but rather as representative.

The present system is to be compared to the objectionable one of preparing a solution of the polymer in oil (1 to 3% by weight at most, which means a lot of oil) and then adding that oil to the oil medium. Under the present invention, the latex contains the polymer in a high concentration (65%). It and the surfactant are easily added to the oil stream, and in this connection it might be mentioned that ordinary presons cannot easily prepare such solutions in the field, even if equipment for making the solution is available at a field site such as pumping station.

Hence while I have disclosed the preferred embodiments of the invention and what is now considered the best mode of practice, changes and variations may be made without departing from the principle of the invention.

I claim:

1. A method of improving transmission efficiency of oil in a pipe comprising: introducing into the pipe containing the oil being transmitted a latex containing a friction reducing polymer selected from the group consisting of cis 1-4 polyisoprene and polyisobutylene dispersed in water, and inverting the latex to disperse the polymer in the oil by concurrently adding an oil soluble non-ionic surfactant selected from the group consisting of sorbitan trioleate and alkylphenoxypoly (ethyleneoxy) ethanol.

* * * * *